Aug. 23, 1938.  H. KUNZI  2,127,777
ICE CREAM FREEZER
Filed Jan. 21, 1937
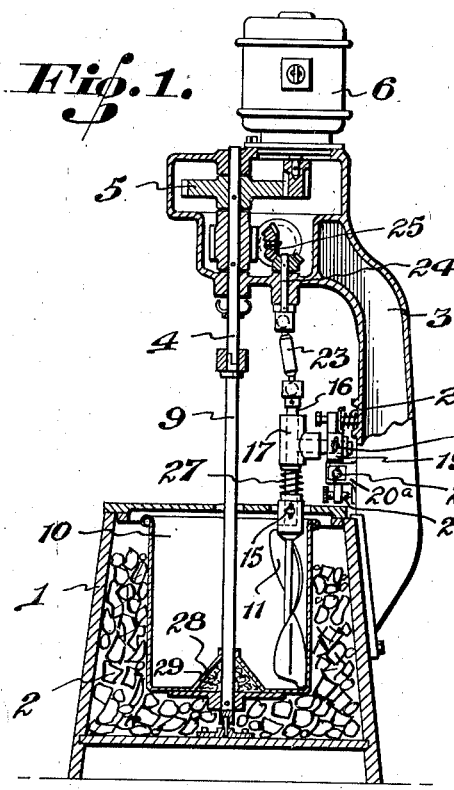
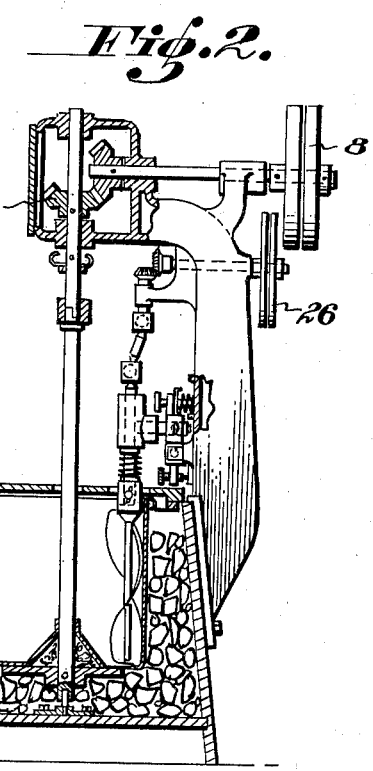
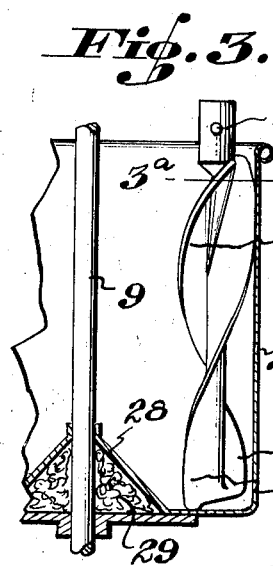
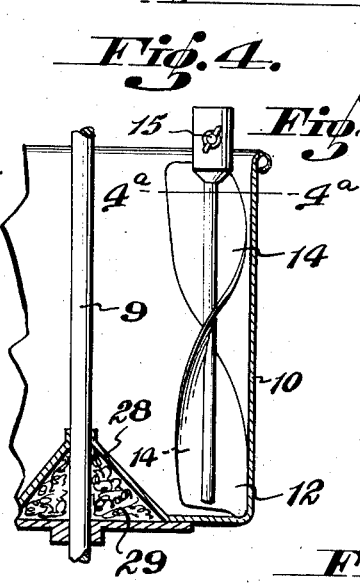
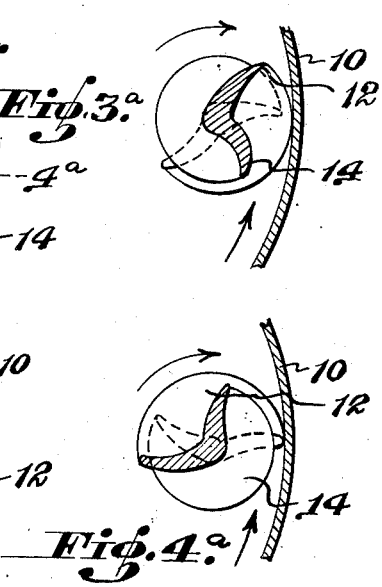
H. Kunzi Inventor Patented Aug. 23, 1938

2,127,777

UNITED STATES PATENT OFFICE 2,127,777

ICE-CREAM FREEZER

Hugo Kunzi, Stuttgart-Feuerbach, Germany

Application January 21, 1937, Serial No. 121,723
In Germany January 23, 1936

9 Claims. (Cl. 259—85)

This invention relates to a machine for making ice-cream and the like, in which the ice-cream material which is in a rotary vessel, which is cooled from the outside, is operated on by means of a spattle worm rotating in the vessel.

Ice-cream making machines having a rotary vessel and a spattle worm disposed in the vessel and rotating about its own axis are already known. These machines have certain disadvantages, however, which reside mostly in this, that the spattle worm on the one hand rotates with the same peripheral speed and in the same direction as the vessel, so that the spattle action is very slight, and that, on the other hand, the spattle worm is not positively driven. The ice-cream material which is shown against the vessel wall is not given sufficient time for taking up cold, owing to the unfavourable rotary conditions, more particularly as the worm consists of several convolutions and, when the worm always bears against the vessel wall and the latter is completely smooth, which however is frequently not the case, works simultaneously at different places and consequently scrapes the material too rapidly from the cooled vessel wall, so that it cannot become sufficiently frozen through. Moreover, owing to the increased amount of stirring to which the material has to be subjected, the power required is considerable. Furthermore, the material resting on the bottom of the vessel is hardly touched at all by the worm and is therefore only brought into the working process to a small extent. A further disadvantage consists in this, that the bearings for the worm are inconvenient and take up much space and several bearing places and constructional parts are disposed in the vessel itself.

In the arrangement according to the invention these disadvantages are overcome through the excentrically arranged spattle worm which rotates in the vessel being positively driven and in opposition to the motion of the vessel and having two threads, of which one thread serves for spattling and scraping and the other thread for feeding and applying ice-cream material to the vessel wall and through the spattling or scraping thread coming in contact with the vessel wall only in points or only along a narrow track, whereas the feeding thread, owing to its smaller diameter, does not come in contact with the vessel wall at all, and furthermore through the speed of revolution of the vessel being many times that of the speed of revolution of the worm. The worm forming the subject matter of the present invention has a steep pitch and less than one complete thread over its entire length, so that there is always only contact between the worm and the vessel wall at one place which continuously wanders downwards and upwards. The spattle thread is provided with a scraper which consists of cellulose, wood or some other material which does not detrimentally affect the vessel wall and the front side of which is rounded. This scraper, owing to its rounded edge, in the first place smooths and presses the material against the vessel wall, during which operation the material is further effectively rubbed down and even the smallest grains of ice are kneaded till they become entirely creamy, and in the second place scrapes off the frozen material.

According to the invention there is interposed in the driving mechanism of the spattle worm a universal joint and the bearing of the worm shaft is made adjustable perpendicular to the axial direction, so as to enable vessels of different size to be used. The shaft bearing is mounted on a holder which is capable of rocking about a horizontal axis, under the action of a spring, and the motion of which is limited by an adjustable stop. The effect of this arrangement is, that the worm is kept permanently pressed against the vessel wall, even if the vessel should oscillate or the vessel wall should have an uneven surface. In order to keep the worm in constant contact with the vessel bottom as well and to draw the material lying on the vessel bottom into the working process, a spring is arranged on the worm which is slidable in the axial direction to act in such a manner that the worm is continuously forced in the direction of the vessel bottom.

The invention is illustrated diagrammatically by way of example in the accompanying drawing, in which Fig. 1 is a vertical central section through an ice-cream freezer with direct electric drive, Fig. 2 is a vertical central section through an ice-cream freezer with belt drive, Figs. 3 and 4 are detail vertical sections through the vessel showing the spattle worm in two different positions, Fig. 3a is a part horizontal section on the line 3a—3a of Fig. 3, Fig. 4a is a part horizontal section on the line 4a—4a of Fig. 4 and Fig. 5 is a detail sectional view on a still larger scale of a portion of the spattle worm.

On a tub 1, in which is disposed the cooling medium 2 (cooling brine or ice), a machine frame 3 is mounted. In this frame is journalled a driving shaft 4 which is driven through spur wheel gearing 5 (Fig. 1) by a motor 6 or by means of bevel wheels 7, (Fig. 2), by a belt pulley 8 or hand wheel. The vessel shaft 9, which is connected to a cylindrical freezing vessel 10, is coupled to the driving shaft 4 and runs at the bottom in a foot-step bearing. The spattle employed is a rotary steeply threaded worm 11 which has a scraper thread 12 (Fig. 3), in which a scraper 13 (Fig. 5) is provided, and a feed thread 14 (Fig. 3) which is smaller in diameter (Fig. 3a) than the scraper thread 12. The worm 11 is releasably connected by means of a screw 15 with the spattle shaft 16 and the latter is journalled in the bearing 17. The bearing 17 is fixed by means of a screw 18 in the spattle holder 19, so as to be adjustable for vessels of different size. The spattle holder 19 is pivotally mounted on lugs 20a on the machine frame 3. mounted on the pin 20 so as to be capable of swinging vertically, the pin 20 being pivotally mounted on lugs 20a on the machine frame 3. A spring 21, the force of which is adjustable by means of a screw, bears against the holder 19 and applies a torque thereto which keeps the scraper 13 always pressed yieldingly against the vessel wall. A stop screw 22 prevents the scraper being held with too great pressure against the vessel wall. The universal joint 23 connects the spattle shaft 16 with the shaft 24 which is driven through a worm and bevel wheel drive 25, from the driving shaft 4 of the vessel. The spattle worm 11 can of course also be driven independently of the machine gearing by means of a belt pulley 26 (Fig. 2) or by means of a motor. The same also applies to machines, in which the vessel is driven from below (so-called "bottom drive"). A spring 27 surrounding the worm shaft bears against the end of the spattle worm and keeps the spattle worm pressed against the vessel bottom. The vessel 10 has a central conical raised part 28, the diameter of which is so large that of the vessel bottom only a ring remains, which is swept over by the spattle worm. The cavity formed by the raised part 28 is filled with insulating material 29. This prevents the ice-cream material freezing on to this part of the vessel.

The vessel 10 rotates at such a high speed of revolution that the ice-cream material is thrown against the vessel wall by centrifugal force. In order that this material shall remain on the vessel wall during the period required for freezing, the speed of revolution of the spattle worm is geared down in a desired ratio to the speed of revolution of the vessel by means of worm and bevel wheel gearing 25.

The scraper thread 12 of the spattle worm is provided with a scraper 13 (Fig. 5) which is made of a material (cellulose, wood or the like) that will not detrimentally affect the vessel wall. The spattle worm 11 rotates in the opposite direction to the direction of rotation of the vessel 10 (Figs. 3a and 4a). By using a worm as the scraper, contact occurs at the bottom of the vessel and at the wall of the vessel always only in one point and the ice-cream material can thus freeze on over the rest of the vessel. The scraping thread 12 (Fig. 3a) has only half a convolution over the whole length of the worm. The feeding thread 14 of the worm 11 has three quarters of a convolution extending over the whole of the length of the worm (Fig. 4a) and its diameter is smaller than that of the scraping thread 11 and is off-set with respect to the latter, so as to follow it (Figs. 3a and 4a). As long as the lower half of the scraping thread 12 scrapes the vessel wall (Fig. 4), the ice-cream material is at the same time caused by the scraper thread to ascend the vessel wall through the opposite direction of rotation of the vessel.

When the scraper thread no longer engages the ice-cream material in the vessel, the material is fed by the following feeding thread 14 to the vessel wall and during the idle running of the scraping thread is continuously laid against the vessel wall in a layer of definite thickness, which ensures thorough freezing. Owing to the scraper 13 being rounded (Fig. 5), the frozen-on ice-cream material, before being scraped off, is pressed against the vessel wall and rubbed down, the smallest particles of ice thereby being completely kneaded into a creamy state.

What I claim is:

1. In an ice-cream freezer, the combination of a rotary freezing vessel for the ice-cream material with a spattle worm having two threads of different diameters arranged inside said freezing vessel with the thread of smaller diameter spaced from the wall of the freezing vessel for raising the ice-cream material in said freezing vessel and the other thread making substantially point contact with said wall for spattling and scraping the ice-cream material from the wall of the freezing vessel, actuating means for rotating the spattle worm and actuating means for rotating the freezing vessel at a speed which is a multiple of that of the spattle worm and in the opposite direction to the direction of rotation of the spattle worm.

2. In an ice-cream freezer, the combination as set forth in claim 1 with a bearing for the spattle worm adjustable radially with respect to the axis of the freezing vessel and a universal joint member interposed in the actuating means for rotating the spattle worm so as to enable the location of the spattle worm to be adjusted to suit freezing vessels of different sizes.

3. In an ice-cream freezer, the combination as set forth in claim 1 with a bearing for the spattle worm adjustable radially with respect to the axis of the freezing vessel, a holder for said bearing capable of turning around a horizontal axis, an adjustable stop for limiting the turning motion of said holder and a universal joint member interposed in the actuating means for rotating the spattle worm so as to enable the location of the spattle worm to be adjusted to suit freezing vessels of different sizes.

4. In an ice-cream freezer, the combination as set forth in claim 1 with a bearing for the spattle worm adjustable radially with respect to the axis of the freezing vessel, a holder for said bearing capable of turning around a horizontal axis, a spring arranged so as to bear against said holder and apply a torque thereto to press the spattle worm yieldingly against the wall of the freezing vessel, an adjustable stop for limiting the turning motion of the holder and a universal joint member interposed in the actuating means for rotating the spattle worm so as to enable the location of the spattle worm to be adjusted to suit freezing vessels of different sizes.

5. In an ice-cream freezer, the combination as set forth in claim 1 with a spring arranged to bear against the end of the spattle worm for pressing the worm against the bottom of the freezing vessel.

6. In an ice-cream freezer, the combination as set forth in claim 1, with a scraper having a rounded front side on the thread of the spattle worm having the larger diameter.

7. In an ice-cream freezer, the combination of a rotary freezing vessel for the ice-cream material with a spattle worm having two threads of different diameters arranged inside said freezing vessel with the thread of smaller diameter spaced from the wall of the freezing vessel for raising the ice-cream material in said freezing vessel the other thread making substantially point contact with said wall for spattling and scraping the ice-cream material from the wall of the freezing vessel, the thread of larger diameter being offset with respect to the thread of smaller diameter so as to follow the thread of smaller diameter.

8. In an ice-cream freezer, the combination as set forth in claim 1, in which the threads of the spattling worm extend around only a portion of the periphery of the worm.

9. In an ice-cream freezer, the combination of a rotary freezing vessel for the ice-cream material with a spattle worm having a thread of smaller diameter extending substantially over the entire length of the worm and comprising three quarters of a convolution and a thread of larger diameter extending substantially over the entire length of the worm and comprising half a convolution, said spattle worm arranged inside said freezing vessel with the thread of smaller diameter spaced from the wall of the freezing vessel for raising the ice-cream material in said freezing vessel the other thread making substantially point contact with said wall for spattling and scraping the ice-cream material from the wall of the freezing vessel, actuating means for rotating the spattle worm and actuating means for rotating the freezing vessel at a speed which is a multiple of that of the spattle worm and in the opposite direction to the direction of rotation of the spattle worm.

HÜGO KUNZI.